United States Patent Office 2,958,708
Patented Nov. 1, 1960

2,958,708
SEPARATION OF ISOMERIC HALOGENATED AROMATIC COMPOUNDS

Raymond N. Fleck, West Covina, and Carlyle G. Wight and Edward L. Wiseman, Fullerton, Calif., assignors to Union Oil Company of California, Los Angeles, Calif., a corporation of California No Drawing. Filed Mar. 23, 1959, Ser. No. 800,961

19 Claims. (Cl. 260—650)

This invention relates to the resolution of mixtures of halogenated aromatic compounds, and in particular concerns an improved process for isolating the isomers of halogen-substituted aromatic hydrocarbons.

In recent years there has been a greatly increased demand for the specific isomers of halogenated aromatic hydrocarbons. These isomers find use as solvents and insecticides and as intermediates in the synthesis of a great many consumer chemicals such as esters, dyes, and photographic developers. The separation of these isomers from each other conventionally requires either the chemical degradation or conversion of one of the isomers, or a combination of operations requiring expensive equipment, severe processing conditions, and extensive staging or repetition of treating steps to produce at best poor yields of marginally pure products. Fractional distillation is usually ineffective because of the similar boiling points of the related isomers.

We have now found that certain adsorbents of the molecular sieve type are selective with respect to certain halogenated aromatic compounds which differ in molecular configuration from another halogenated aromatic component of a mixture, e.g., mixtures of di-halo-benzene isomers, of halo-toluene isomers, and of halo-naphthalene isomers. More particularly, we have found that halogenated aromatic isomers selected from the class consisting of di-halo-benzenes, halo-toluenes, and halo-naphthalenes in which the halogen is selected from the class consisting of bromine and chlorine, can be separated from each other by a process which comprises contacting the isomer mixture in either liquid or vapor phase with a lean molecular sieve adsorbent to obtain a rich adsorbent containing the more readily adsorbed component of the feed mixture and an unadsorbed or raffinate phase enriched in the less readily adsorbed component; separating the rich adsorbent from the non-adsorbed phase; and treating the rich adsorbent to desorb the selectively adsorbed isomer therefrom, thus returning the adsorbent to a lean state for re-use in the next succeeding cycle of operation.

Considering now the process of the invention in detail, it is generally applicable to fluid organic mixtures comprising at least two halogenated aromatic isomers of the present class, e.g., dichlorobenzenes, dibromobenzenes, chlorotoluenes, bromotoluenes, chloronaphthalenes, and bromonaphthalenes. Such mixtures are usually prepared by halogen substitution of the aromatic nucleus in the presence of catalysts of the same type as those effective in promoting Friedel and Crafts reactions, e.g., aluminum chloride, iodine, ferric chloride, ferric bromide and the like. Often such halogenated aromatic mixtures contain as much as 50 percent hydrocarbons but the presence of such hydrocarbons in such amounts in no way affects the selectivity of the adsorbent. Of the total amount of halogenated aromatic compounds of the present class in the feed stream, the more readily adsorbed isomer can represent from about 1 to about 99 percent and the less readily adsorbed isomer can represent from about 99 to about 1 percent.

The adsorbents which are employed in accordance with the invention are crystalline zeolitic partially dehydrated metallo alumino silicates having pores of substantially uniform diameter between about 7 A. and about 13 A. These materials are known as "molecular sieves," and their mode of preparation and properties are described in British Patent No. 777,233. Certain naturally occurring minerals can be heated to dehydrate the molecules and obtain an activated zeolitic adsorbent of such type. However, we greatly prefer the synthetic materials which are conveniently prepared by heating suitable quantities of alumina and silica with an excess of sodium hydroxide and thereafter washing out the excess to obtain a synthetic crystalline zeolitic sodium alumino silicate having a pore diameter of about 13 A. and having a typical approximate composition corresponding to $[6Na_2O \cdot 6Al_2O_3 \cdot 15SiO_2]$ on a water-free basis. The uniform diameter of this product can be altered by exchanging part of the sodium cation with other atoms. For example, such a product can be heated with a concentrated solution of a calcium salt, e.g., calcium chloride at superatmospheric pressure and at 20° C. to 175° C., washed with water to remove excess calcium chloride, and thereafter partially dehydrated by heating to obtain a calcium sodium alumino silicate having a pore diameter of about 10 A. and having a typical average molecular structure on a water-free basis corresponding to

Other divalent cations such as magnesium, strontium, and barium can be employed instead of calcium. While any molecular sieve having a pore diameter between about 7 A. and 13 A. may be employed in accordance with the invention, it is preferred to use the 10 A. calcium sodium alumino silicate and the 13 A. sodium alumino silicate referred to above which are available commercially under the trade names "Molecular Sieves 10X" and "Molecular Sieves 13X" and which usually contain substantial amounts of inert binder materials.

The optimum particle size of the adsorbent will depend upon the manner in which it is used in the process, i.e., as a fixed compact bed, moving compact bed, a fluidized bed, etc., but is usually between about 2 and about 400 mesh, preferably between about 4 and about 30 mesh for fixed and moving compact beds and between about 100 and about 300 mesh for fluidized beds.

The adsorbent is preferably employed in the form of a dense compact fixed or moving bed which is alternately contacted with the feed and then desorbed. In the simplest embodiment of the invention, the adsorbent is employed in the form of a single static bed, in which case the process is only semi-continuous. Preferably a set of two or more static beds is employed in fixed-bed contacting with appropriate valving so that the feed stream is passed through one or more adsorbent beds while the desorption is carried out in one or more other beds in the set.

The direction of flow during adsorption and desorption can be either up or down through the adsorbent but preferably the adsorption is carried out in one flow direction and the desorption in the other. Any of the conventional apparatus employed in static bed fluid-solids contacting can be used. A moving compact bed of an adsorbent has a greater separation efficiency than a fixed compact bed of the same size because of the ability of the former to provide reflux. The moving compact bed is, therefore, preferable when a high degree of separation is desired or when the feed mixture separation factor is poor.

As previously stated, the feed mixture is contacted with the adsorbent in either the vapor or liquid phase. The pressure is usually near atmospheric but can be either subatmospheric or superatmospheric. In general, the adsorption is carried out at a temperature between about 0° F. and about 800° F., preferably between about 100° F. and 700° F. and at pressures between about atmospheric and about 1000 p.s.i.g., preferably between about 0 p.s.i.g. and about 100 p.s.i.g.

The immediate products of the initial adsorption step are an unadsorbed or raffinate phase which is rich in the more readily adsorbed halogenated aromatic isomer of the feed mixture and lean in the less readily adsorbed isomer, and a solid rich adsorbent containing an adsorbate rich in the more readily adsorbed isomer of the feed mixture and lean in the less readily adsorbed isomer. The solid adsorbent and the unadsorbed phase are separated, and the latter is passed to storage as one of the halogenated aromatic isomer products of the process. The rich adsorbent on the other hand is treated to desorb the isomer therefrom and to return the adsorbent to a lean state for re-use. According to one mode of operation, such treatment comprises subjecting the rich adsorbent to an elevated temperature and/or reduced pressure. The use of elevated temperatures and/or reduced pressures can also be combined with the use of a stripping gas or a displacement exchange fluid in the known manner.

In accordance with a preferred mode of operation, the rich adsorbent is treated with a suitable displacement exchange fluid at approximately the same temperature and pressure as that employed in the initial adsorption step. The displacement exchange fluid can be any material which is inert with respect to the adsorbent and the feed mixture, which is adsorbable by the adsorbent, and which is readily separated from the components of the feed mixture by distillation, absorption, or other conventional means. Preferably, the displacement exchange fluid is one which has a boiling point substantially outside the boiling range of the feed mixture and has an adsorbability substantially the same as that of the adsorbed components of the feed mixture. Chlorobenzene is a preferred displacement exchange fluid for the process. Other materials which can be employed include halogen-substituted benzenes, halogen-substituted toluenes, alkyl-substituted pyridines, halogen-substituted naphthalenes and aromatic hydrocarbons having a boiling point at least 10° C., and preferably 20° C., outside of the boiling range of the feed mixture.

The following examples specifically illustrate the practice of the invention.

Example I

Several halogenated aromatic isomer mixtures are used as feeds in contacting in the vapor phase a lean granular "Molecular Sieves 10X" adsorbent (10 A. zeolitic calcium sodium alumino silicate) for about one hour at about 200° C. and at pressures as shown in Table 1. The unadsorbed phase is separated from the rich adsorbent and analyzed for the distribution of the halogenated aromatic isomer components. The rich adsorbent is then desorbed by displacement exchange with chlorobenzene. The results of these adsorptive separations are shown in Table 1 where component (A) is selectively adsorbed.

TABLE 1

| Component (A) | Component (B) | Isomer composition, weight percentage | | | | | |
|---|---|---|---|---|---|---|---|
| | | Feed | | Unadsorbed Phase | | Adsorbed Phase | |
| | | (A) | (B) | (A) | (B) | (A) | (B) |
| o-bromotoluene | m-bromotoluene | 51 | 49 | 49 | 51 | 53 | 47 |
| m-bromotoluene | p-bromotoluene | 49 | 51 | 46 | 54 | 52 | 48 |
| o-chlorotoluene | p-chlorotoluene | 50 | 50 | 45 | 55 | 56 | 45 |
| p-dichlorobenzene | m-dichlorobenzene | 15 | 85 | 14 | 86 | 17 | 83 |
| o-dichlorobenzene | m-dichlorobenzene | 51 | 49 | 45 | 55 | 58 | 42 |
| 1-chloronaphthalene | 2-chloronaphthalene | 81 | 19 | 79 | 21 | 82 | 18 |

Example II

In another series of runs a "Molecular Sieves 13X" (13 A. zeolitic sodium alumino silicate adsorbent) is substituted for the "Molecular Sieves 10X" in an experiment conducted in the same manner as Example I. Table 2 shows the selective adsorption of component (A) in this system.

TABLE 2

| Component (A) | Component (B) | Isomer composition, weight percentage | | | | | |
|---|---|---|---|---|---|---|---|
| | | Feed | | Unadsorbed Phase | | Adsorbed Phase | |
| | | (A) | (B) | (A) | (B) | (A) | (B) |
| m-bromotoluene | o-bromotoluene | 50 | 50 | 48 | 52 | 52 | 48 |
| m-bromotoluene | p-bromotoluene | 50 | 50 | 46 | 54 | 55 | 45 |
| o-chlorotoluene | p-chlorotoluene | 50 | 50 | 49 | 51 | 52 | 48 |
| o-dichlorobenzene | m-dichlorobenzene | 51 | 49 | 46 | 54 | 56 | 44 |
| 2-chloronaphthalene | 1-chloronaphthalene | 19 | 81 | 16 | 84 | 21 | 79 |

Example III

In this run, the unadsorbed phase from the separation of o-chlorotoluene and p-chlorotoluene in Example I is reprocessed in the same manner as the original feed and a correspondingly higher p-chlorotoluene concentration is obtained in the resulting raffinate phase. The final p-chlorotoluene concentration is about 98 percent after five successive stages of treatment.

Example IV

In another run, a mixture comprising 43 percent p-bromotoluene and 57 percent m-bromotoluene is circulated for about one hour through a lean "Molecular Sieves 10X" (zeolitic calcium sodium alumino silicate) adsorbent bed at about 100° C. and atmospheric pressure. The unadsorbed phase is found to contain 53 percent p-bromotoluene and 47 percent m-bromotoluene. The rich adsorbent is then stripped with chlorobenzene at 100° C. and atmospheric pressure yielding an adsorbate substantially enriched in m-bromotoluene.

Example V

Another run, conducted in the same manner and with the same feed as Example IV, except that a pressure of 75 p.s.i.g. and a temperature of about 150° C. is maintained during adsorption and stripping, yields essentially the same separation of para- and meta-bromotoluene as found in Example IV.

When a cation other than calcium, e.g., barium, strontium, sodium, potassium, etc., is employed in the preparation of the zeolitic crystalline metallo alumino silicate adsorbents, similar selective separations are obtained with the halogenated isomeric mixtures of Examples I and II.

Although the deactivation of the adsorbent is gradual, some deactivation can eventually occur. It is within the scope of this invention to reactivate the silicate adsorbent by high temperature contacting with a hot reactivating gas such as flue gas, air, etc.

As will be apparent, the process of the invention essentially comprises solids-fluid contacting operations, and any of the various techniques and equipment conventionally applied to such type of operation can be adapted to the practice of the invention without departing from the scope thereof. Thus, while it is often preferred to maintain the adsorbent in the form of a moving bed, i.e., as a solids-fluid contacting operation in which a compact bed of the adsorbent is passed successively through adsorption and desorption zones where it is concurrently or countercurrently contacted with the feed stream and the displacement exchange fluid, respectively, the process is nevertheless operable in the form of a fixed compact bed. Also, the solids-fluid contacting operation can be carried out employing fluidized techniques whereby the adsorbent is employed in relatively small particle size and is suspended by the flow of the fluid with which it is contacted.

Other modifications and adaptations which would occur to one skilled in this particular art are to be included in the spirit and scope of this invention as defined by the following claims.

We claim:

1. The process for treating a fluid mixture comprising at least two isomeric compounds selected from the class consisting of di-halo-benzenes, mono-halo-toluenes and mono-halo-naphthalenes in which the halogen is selected from the class consisting of bromine and chlorine, which process comprises contacting said mixture with a solid granular adsorbent consisting essentially of a partially dehydrated crystalline zeolitic sodium metallo alumino silicate having pores of substantially uniform diameter between about 7 A. and about 13 A. whereby there is obtained a rich adsorbent containing adsorbed components of said mixture and a fluid raffinate product comprising the non-adsorbed components of said mixture, and treating said rich adsorbent to remove said adsorbed components therefrom as a fluid extract product, the proportion of said isomers in said extract product being different from the proportion of said isomers in said raffinate product.

2. A process according to claim 1 wherein said adsorbent essentially comprises a zeolitic sodium alumino silicate having substantially uniform diameter pores of about 13 A.

3. A process according to claim 1 wherein said adsorbent essentially comprises a zeolitic calcium sodium alumino silicate having substantially uniform diameter pores of about 10 A.

4. A process as defined by claim 1 wherein said contacting and said treating are effected in the vapor phase.

5. A process as defined by claim 1 wherein said treatment of said rich adsorbent comprises contacting the same with a displacement exchange fluid which is readily separated from said extract product and said raffinate product.

6. A process according to claim 1 wherein said contacting and said treating are carried out at substantially the same temperature and pressure.

7. A process as defined by claim 1 wherein said isomers are the isomers of di-chlorobenzene.

8. A process as defined by claim 1 wherein said isomers are the isomers of chlorotoluene.

9. A process as defined by claim 1 wherein said isomers are the isomers of chloronaphthalene.

10. A process according to claim 5 wherein said displacement exchange fluid is chlorobenzene.

11. A process for treating a fluid mixture comprising at least two isomeric compounds selected from the class consisting of di-halo-benzenes, mono-halo-toluenes, and mono-halo-naphthalenes in which the halogen is selected from the class consisting of bromine and chlorine, which process comprises: (1) contacting said mixture with a lean solid granular adsorbent consisting essentially of a partially dehydrated crystalline zeolitic metallo alumino silicate having pores of substantially uniform diameter between about 7 A. and about 13 A. whereby there is obtained a rich adsorbent containing adsorbed components of said mixture and a fluid raffinate product comprising the non-adsorbed components of said mixture; (2) contacting said rich adsorbent with a displacement exchange fluid whereby there is obtained a solid lean adsorbent containing adsorbed displacement exchange fluid and an extract fluid; (3) returning said lean adsorbent to Step (1); (4) separately treating said extract and raffinate products to separate said displacement exchange fluid therefrom; and (5) returning the separated displacement exchange fluid to Step (2), the proportion of said isomers in said extract product being different from the proportion of said isomers in said raffinate product.

12. A process according to claim 11 wherein said adsorbent essentially comprises a zeolitic sodium alumino silicate having substantially uniform diameter pores of about 13 A.

13. A process according to claim 11 wherein said adsorbent essentially comprises a zeolitic calcium sodium alumino silicate having substantially uniform diameter pores of about 10 A.

14. A process according to claim 11 wherein said displacement fluid is chlorobenzene.

15. A process as defined by claim 11 wherein said isomers are the isomers of di-chlorobenzene.

16. A process as defined by claim 11 wherein said isomers are the isomers of chlorotoluene.

17. A process as defined by claim 11 wherein said isomers are the isomers of chloronaphthalene.

18. A process of defined by claim 11 wherein in Steps (1) and (2) said mixture and said displacement exchange fluid are contacted with said adsorbent in the vapor phase.

19. The process for treating a fluid mixture comprising at least two isomeric compounds selected from the class consisting of di-halo-benzenes, mono-halo-toluenes and mono-halo-naphthalenes in which the halogen is selected from the class consisting of bromine and chlorine, which process comprises: contacting said mixture with a solid granular adsorbent consisting essentially of a partially dehydrated crystalline zeolitic sodium metallo alumino silicate having pores of substantially uniform diameter between about 7 A. and about 13 A.; and separating the solid phase from the fluid phase, the proportion of said isomers in said solid phase being different from the proportion of said isomers in said fluid phase.

References Cited in the file of this patent

UNITED STATES PATENTS 2,882,243   Milton _____ Apr. 14, 1959

UNITED STATES PATENT OFFICE
Certificate

Patent No. 2,958,708                              Patented November 1, 1960

Raymond N. Fleck, Carlyle G. Wight and Edward L. Wiseman

Application having been made jointly by Raymond N. Fleck, Carlyle G. Wight, and Edward L. Wiseman, the inventors named in the patent above identified, and Union Oil Company of California, Los Angeles, California, a corporation of California, the assignee, for the issuance of a certificate under the provisions of Title 35, Section 256 of the United States Code, deleting the name of the said Edward L. Wiseman from the patent as a joint inventor, and a showing and proof of facts satisfying the requirements of the said section having been submitted, it is this 5th day of March 1963, certified that the name of the said Edward L. Wiseman is hereby deleted from the said patent as a joint inventor with the said Raymond N. Fleck and Carlyle G. Wight.

[SEAL]

EDWIN L. REYNOLDS,
*First Assistant Commissioner of Patents.*